(12) United States Patent
Hayashi

(10) Patent No.: US 12,146,943 B2
(45) Date of Patent: Nov. 19, 2024

(54) SENSING METHOD AND SENSING DEVICE

(71) Applicant: SOCIONEXT INC., Kanagawa (JP)

(72) Inventor: Joji Hayashi, Yokohama (JP)

(73) Assignee: SOCIONEXT INC., Kanagawa (JP)

( * ) Notice: Subject to any disclaimer, the term of this patent is extended or adjusted under 35 U.S.C. 154(b) by 590 days.

(21) Appl. No.: 17/189,174

(22) Filed: Mar. 1, 2021

(65) Prior Publication Data

US 2021/0181328 A1  Jun. 17, 2021

Related U.S. Application Data

(63) Continuation of application No. PCT/JP2018/032850, filed on Sep. 5, 2018.

(51) Int. Cl.
*G01S 13/536* (2006.01)
*G01S 13/04* (2006.01)
*G01S 13/86* (2006.01)
*G01S 17/04* (2020.01)

(52) U.S. Cl.
CPC ............ *G01S 13/536* (2013.01); *G01S 13/04* (2013.01); *G01S 13/86* (2013.01); *G01S 17/04* (2020.01)

(58) Field of Classification Search
CPC ........ G01S 13/536; G01S 17/04; G01S 13/04; G01S 13/86
See application file for complete search history.

(56) References Cited

U.S. PATENT DOCUMENTS

| 4,509,049 A | 4/1985 | Haendel et al. |
| 5,652,589 A | 7/1997 | Ono et al. |
| 6,067,038 A | 5/2000 | Uehara et al. |
| 8,390,507 B2 | 3/2013 | Wintermantel |
| 2003/0048216 A1 | 3/2003 | Kishida |
| 2004/0125010 A1 | 7/2004 | Natsume et al. |

(Continued)

FOREIGN PATENT DOCUMENTS

| CN | 104237878 A | 12/2014 |
| JP | H08-005733 A | 1/1996 |

(Continued)

OTHER PUBLICATIONS

Notice of Reasons for Refusal dated Aug. 30, 2022 issued in the corresponding Japanese Patent Application No. 2020-540913, with English translation.

(Continued)

*Primary Examiner* — Vladimir Magloire
*Assistant Examiner* — Noah Yi Min Zhu
(74) *Attorney, Agent, or Firm* — Rimon P.C.

(57) ABSTRACT

A sensing method includes: (a) performing first sensing to detect presence or absence of the object in a specific detection area using a first sensor signal received by a radar sensor from the specific detection area; (b) when the presence of the object in the specific detection area is detected by the first sensing in (a), continuing the first sensing and performing second sensing to detect a motion of the object using a second sensor signal transmitted from the radar sensor to the specific detection area, the second sensor signal having a sensing rate higher than a sensing rate of the first sensor signal; and (c) when the absence of the object in the specific detection area is detected by the first sensing in (b), stopping the second sensing and continuing the first sensing.

12 Claims, 10 Drawing Sheets

(56) References Cited

U.S. PATENT DOCUMENTS

| | | |
|---|---|---|
| 2012/0050093 A1 | 3/2012 | Heilmann et al. |
| 2013/0138314 A1* | 5/2013 | Viittala ................ G01S 5/0263 342/146 |
| 2017/0123058 A1* | 5/2017 | Yavari .................... G01S 13/86 |

FOREIGN PATENT DOCUMENTS

| | | | |
|---|---|---|---|
| JP | H08-136647 A | 5/1996 | |
| JP | H10-104355 A | 4/1998 | |
| JP | H11-064499 A | 3/1999 | |
| JP | 2002-236169 A | 8/2002 | |
| JP | 2003-222673 A | 8/2003 | |
| JP | 2003222673 * | 8/2003 | ............. G01S 13/93 |
| JP | 2004-144665 A | 5/2004 | |
| JP | 2008-045987 A | 2/2008 | |
| JP | 2010-109708 A | 5/2010 | |
| JP | 2012-211485 A | 11/2012 | |
| JP | 2014-062804 A | 4/2014 | |
| JP | 2016-057168 A | 4/2016 | |
| KR | 10-1533066 B1 | 7/2015 | |

OTHER PUBLICATIONS

Japanese Office Action mailed on Feb. 28, 2023 for corresponding Japanese Patent Application No. 2020-540913, with English machine translation as a concise explanation.

International Search Report and Written Opinion issued on Dec. 4, 2018 in International Patent Application No. PCT/JP2018/032850; with English translation.

Notice of Reasons for Refusal dated Jul. 4, 2023 issued in the corresponding Japanese Patent Application No. 2020-540913, with English machine translation as a concise explanation.

Decision of Refusal mailed Oct. 10, 2023 in Japanese Patent Application No. 2020-540913.

Chinese Office Action dated Dec. 27, 2023 issued in the corresponding Chinese Patent Application No. 201880096895.X, with English machine translation.

\* cited by examiner

SENSING METHOD AND SENSING DEVICE

CROSS REFERENCE TO RELATED APPLICATIONS

This is a continuation application of PCT Patent Application No. PCT/JP2018/032850 filed on Sep. 5, 2018, designating the United States of America. The entire disclosure of the above-identified application, including the specification, drawings and claims is incorporated herein by reference in its entirety.

FIELD

The present disclosure relates to a sensing method and a sensing device that detect presence and a motion of an object in a specific detection area.

BACKGROUND

A sensing device that detects presence and a motion of an object in a specific detection area has been known (for example, see Patent Literature (PTL) 1). This type of sensing device performs a frequency analysis on radar signals received by a plurality of antennas, and then processes the signals to achieve long-range detection and short-range detection.

In the long-range detection, the presence of an object is detected by adding the results of the frequency analysis performed on received signals (radar signals) together as complex numbers. In contrast, in the short-range detection, the presence of an object is detected by adding the results of the frequency analysis performed on received signals together as amplitudes.

CITATION LIST

Patent Literature

PTL 1: Japanese Unexamined Patent Application Publication No. 2016-57168

SUMMARY

Technical Problem

In general, high detection resolution for, for example, distance and speed, is required in radar systems to accurately detect a motion of an object. On the other hand, in order to detect the presence of an object in a relatively wide detection range, it is necessary to increase the number of sampling data during sensing, or to increase the detection distance by lowering the detection resolution.

However, in the conventional sensing device described above, the long-range detection and the short-range detection both use the same sampling signals. Therefore, the detection resolution is the same for the long-range detection and the short-range detection. Therefore, it is not possible to set the detection range and the detection resolution suitable for both the long-range detection and the short-range detection.

The present disclosure relates to a sensing method and a sensing device that detect both presence and a motion of an object accurately in a specific detection area.

Solution to Problem

A sensing method according to one aspect of the present disclosure is a sensing method for detecting presence and a motion of an object in a specific detection area using a sensor, the sensing method including: (a) performing first sensing to detect presence or absence of the object in the specific detection area using a first sensor signal received by the sensor from the specific detection area; (b) when the presence of the object in the specific detection area is detected by the first sensing in (a), continuing the first sensing and performing second sensing to detect a motion of the object using a second sensor signal transmitted from the sensor to the specific detection area, the second sensor signal having a sensing rate higher than a sensing rate of the first sensor signal; and (c) when the absence of the object in the specific detection area is detected by the first sensing in (b), stopping the second sensing and continuing the first sensing.

Note that these comprehensive or specific aspects of the present disclosure may be implemented as a system, a method, an integrated circuit, a computer program, or a computer-readable recording medium such as a CD-ROM, or may be implemented as any combination of a system, a method, an integrated circuit, a computer program, and a recording medium.

Advantageous Effects

With the sensing method and the sensing device according to one or more aspects of the present disclosure, both the presence and a motion of an object in a specific detection area can be detected accurately.

BRIEF DESCRIPTION OF DRAWINGS

These and other advantages and features will become apparent from the following description thereof taken in conjunction with the accompanying Drawings, by way of non-limiting examples of embodiments disclosed herein.

DESCRIPTION OF EMBODIMENTS

Figure 1:
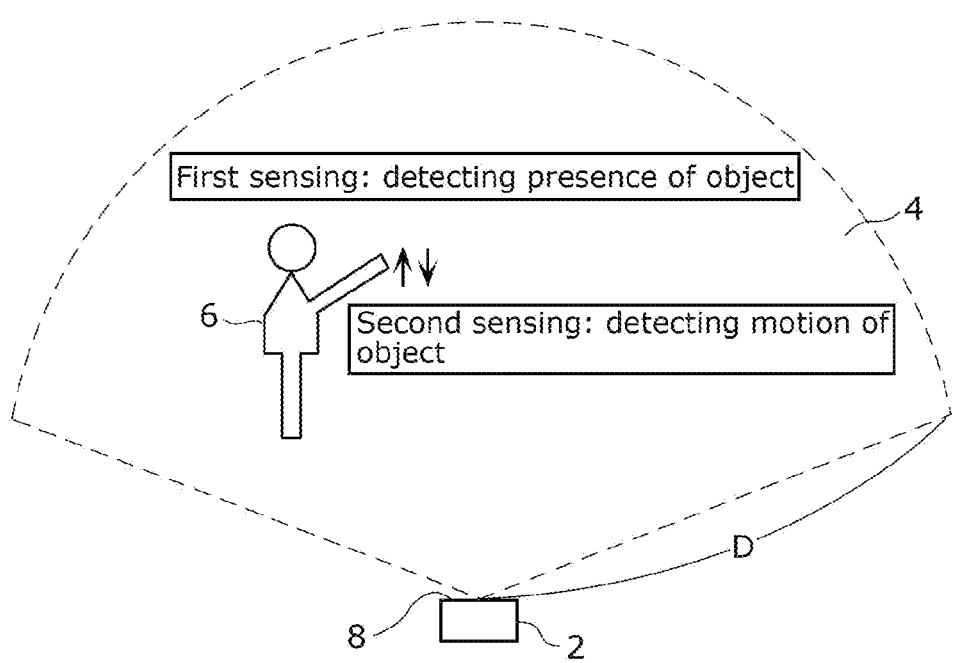
FIG. 1 is a schematic diagram for describing first sensing and second sensing to be performed by a sensing device according to Embodiment 1.

A sensing method according to one aspect of the present disclosure is a sensing method for detecting presence and a motion of an object in a specific detection area using a sensor, the sensing method including: (a) performing first sensing to detect presence or absence of the object in the specific detection area using a first sensor signal received by the sensor from the specific detection area; (b) when the presence of the object in the specific detection area is detected by the first sensing in (a), continuing the first sensing and performing second sensing to detect a motion of the object using a second sensor signal transmitted from the sensor to the specific detection area, the second sensor signal having a sensing rate higher than a sensing rate of the first sensor signal; and (c) when the absence of the object in the specific detection area is detected by the first sensing in (b), stopping the second sensing and continuing the first sensing.

With this aspect, the first sensor signal is used in the first sensing, and the second sensor signal having a sensing rate higher than a sensing rate of the first sensor signal is used in the second sensing. This makes the detection resolution of the second sensor signal in the second sensing higher than the detection resolution of the first sensor signal in the first sensing. As a result, both the presence and a motion of an object in a specific detection area can be detected accurately. In addition, for example, when an object goes outside the specific detection area during which both the first sensing and the second sensing are being performed, the second sensing is stopped and the first sensing is continued. This allows the second sensing to resume smoothly if, for example, the object enters the specific detection area again.

For example, the sensor may be a radar sensor that transmits and receives the first sensor signal and the second sensor signal, and each of the first sensor signal and second sensor signal may be a frequency modulated continuous wave (FMCW) radar signal, the FMCW radar signal being obtained by modulating a frequency of a continuous wave radar signal.

With this aspect, the first sensing can be performed using the first sensor signal, which is an FMCW radar signal, and the second sensing can be performed using the second sensor signal, which is an FMCW radar signal.

For example, the first sensing may include transmitting the first sensor signal from the sensor per first sensing time, and the second sensing may include transmitting the second sensor signal from the sensor per second sensing time, the second sensing time being shorter than the first sensing time.

For example, the first sensor signal may be an FMCW radar signal that includes at least one chirp waveform in the first sensing time, and the second sensor signal may be an FMCW radar signal that includes at least one chirp waveform in the second sensing time.

This aspect makes it possible to set the number of chirp waveforms of the first sensor signal and the second sensor signal appropriately according to sensing contents. For example, when one of the first sensor signal and the second sensor signal includes a plurality of chirp waveforms, the speed of a motion of the object can be detected.

For example, the first sensing may include modulating the first sensor signal with a first modulation bandwidth and transmitting, from the sensor, the first sensor signal modulated, and the second sensing may include modulating the second sensor signal with a second modulation bandwidth and transmitting, from the sensor, the second sensor signal modulated, the second modulation bandwidth being wider than the first modulation bandwidth.

For example, the first sensing may include: generating a beat signal by combining the first sensor signal transmitted from the sensor and a reflected signal of the first sensor signal, the reflected signal being received by the sensor; and detecting the presence of the object in the specific detection area when a signal strength of the beat signal is greater than or equal to a threshold.

This aspect makes it easy to detect presence or absence of an object in a specific detection area by comparing the signal strength of the beat signal with the threshold.

For example, the first sensing may include detecting the absence of the object in the specific detection area when a beat frequency of the beat signal falls outside a predetermined frequency range, the predetermined frequency range being determined according to the specific detection area.

With this aspect, the presence of an object in a specific detection area can be detected accurately.

For example, the sensor may include: an infrared sensor that receives infrared radiation as the first sensor signal; and a radar sensor that transmits and receives the second sensor signal, the second sensor signal being a frequency modulated continuous wave (FMCW) radar signal.

With this aspect, the first sensing can be performed using the first sensor signal, which is infrared radiation, and the second sensing can be performed using the second sensor signal, which is an FMCW radar signal.

Moreover, a sensing device according to one aspect of the present disclosure is a sensing device that detects presence and a motion of an object in a specific detection area, the sensing device including: a sensor that receives a first sensor signal from the specific detection area and transmits a second sensor signal to the specific detection area, the second sensor signal having a sensing rate higher than a sensing rate of the first sensor signal; and a controller that controls the sensor. The controller: (a) performs first sensing to detect presence or absence of the object in the specific detection area using the first sensor signal; (b) continues the first sensing and performs second sensing to detect a motion of the object using the second sensor signal, when the presence of the object in the specific detection area is detected by the first sensing in (a); and (c) stops the second sensing and continues the first sensing, when the absence of the object in the specific detection area is detected by the first sensing in (b).

With this aspect, the first sensor signal is used in the first sensing, and the second sensor signal having a sensing rate higher than a sensing rate of the first sensor signal is used in the second sensing. This makes the detection resolution of the second sensor signal in the second sensing higher than the detection resolution of the first sensor signal in the first sensing. As a result, both the presence and a motion of an object in a specific detection area can be detected accurately. In addition, for example, when an object goes outside the specific detection area during which the controller performs both the first sensing and the second sensing, the controller stops the second sensing and continues the first sensing. This allows the second sensing to resume smoothly if, for example, the object enters the specific detection area again.

The following describes embodiments in detail with reference to the drawings.

Note that each embodiment described below shows a general or specific example. The numerical values, shapes, materials, structural components, the arrangement and connection of the structural components, steps and the order of the steps mentioned in the following embodiment are mere examples and not intended to limit the present disclosure. Of the structural components in the following embodiments, structural components not recited in any one of the independent claims representing broadest concepts are described as optional structural components.

In addition, each diagram is not necessarily a precise illustration. Moreover, throughout the figures, structural components that are essentially the same share like reference signs, and duplicate description is omitted or simplified.

Embodiment 1

[1-1. Configuration of Sensing Device]

Figure 2:
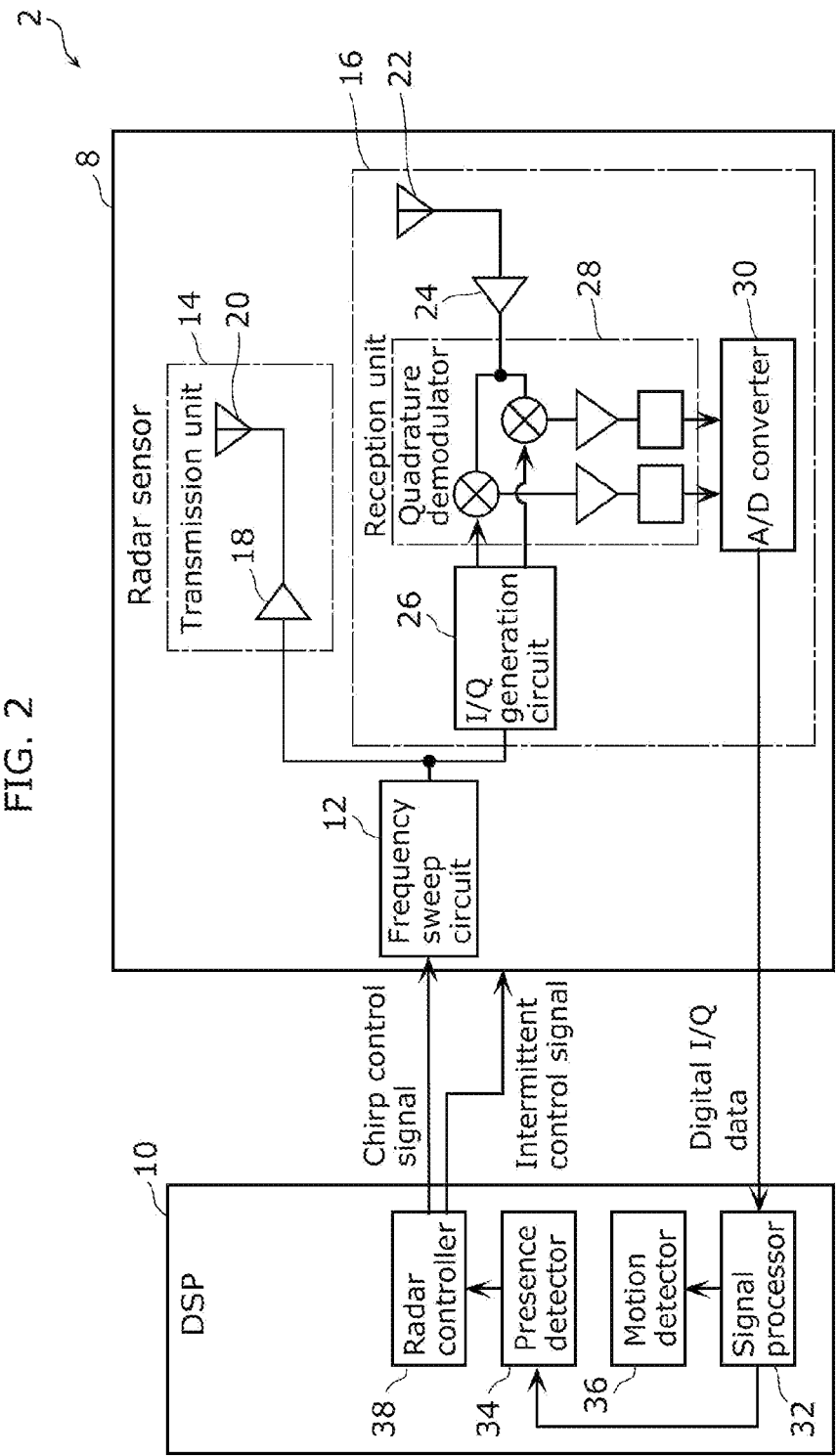
FIG. 2 is a block diagram illustrating the configuration of the sensing device according to Embodiment 1.

First, the configuration of sensing device 2 according to Embodiment 1 will be described with reference to FIG. 1 and FIG. 2. FIG. 1 is a schematic diagram for describing first sensing and second sensing to be performed by sensing device 2 according to Embodiment 1. FIG. 2 is a block diagram illustrating the configuration of sensing device 2 according to Embodiment 1.

As illustrated in FIG. 1, sensing device 2 is a device for detecting presence and a motion of object 6 in specific detection area 4. In other words, sensing device 2 performs first sensing to detect presence or absence of object 6 in specific detection area 4 using a first sensor signal (will be described later), and performs second sensing to detect motion of object 6 in specific detection area 4 using a second sensor signal (will be described later) that is different from the first sensor signal. Moreover, sensing device 2 switches between a presence detection mode and a motion detection mode. In the presence detection mode, only the first sensing is performed. In the motion detection mode, both the first sensing and the second sensing are performed. Note that as illustrated in FIG. 1, specific detection area 4 extends from radar sensor 8 (will be described later) of sensing device 2 to, for example, a range of distance D (for example, 5 m) in a substantially fan shape.

Sensing device 2 can be applied as a user interface provided in an artificial intelligence (AI) speaker, for example. In this case, object 6 is a user who operates the AI speaker, for example. The user (object 6) can cause a gesture-enabled AI speaker to operate by performing a gesture while the user is in specific detection area 4. For example, the user can increase the volume of the AI speaker when the user makes a gesture of raising his/her left arm, and decrease the volume of the AI speaker when the user makes a gesture of putting his/her left arm down.

As illustrated in FIG. 2, sensing device 2 includes radar sensor 8 (an example of a sensor) and digital signal processor 10 (hereinafter referred to as "DSP 10") (an example of a controller).

As illustrated in FIG. 2, radar sensor 8 is a radio frequency (RF) unit that is used to transmit and receive the first sensor signal and the second sensor signal. Here, the RF frequency of radar sensor 8 is the 60 GHz band. Note that in the present embodiment, the frequency used for radar sensor 8 is set to 60 GHz band, but the present disclosure is not limited to such configuration. Any frequency band that can be used as radar, such as 24 GHz band or 79 GHz band, may be used.

Radar sensor 8 includes frequency sweep circuit 12, transmission unit 14, and reception unit 16.

Frequency sweep circuit 12 generates the first sensor signal and the second sensor signal, based on a chirp control signal from DSP 10 (will be described later). Each of the first sensor signal and the second sensor signal is a frequency modulated continuous wave (FMCW) radar signal, which is a signal obtained by modulating a frequency of a continuous wave. Frequency sweep circuit 12 outputs the generated first and second sensor signals to power amplifier 18 (will be described later) of transmission unit 14 and in-phase/quadrature (I/Q) generation circuit 26 (will be described later) of reception unit 16.

Transmission unit 14 includes power amplifier 18 and transmission antenna 20.

Power amplifier 18 amplifies the first sensor signal and the second sensor signal output from frequency sweep circuit 12.

Transmission antenna 20 transmits the first sensor signal and the second sensor signal output from power amplifier 18 to specific detection area 4.

Reception unit 16 includes reception antenna 22, low noise amplifier 24, I/Q generation circuit 26, quadrature demodulator 28, and A/D converter 30.

Reception antenna 22 receives a reflected signal of the first sensor signal and a reflected signal of the second sensor signal that are reflected off one or more objects (including object 6) that are present in specific detection area 4.

Low noise amplifier 24 amplifies the reflected signal of the first sensor signal and the reflected signal of the second sensor signal that are received by reception antenna 22 and outputs the reflected signals to quadrature demodulator 28.

I/Q generation circuit 26 generates a local signal of the first sensor signal and outputs the local signal to quadrature demodulator 28. The local signal has a 90° phase difference from the first sensor signal received from frequency sweep circuit 12. Moreover, I/Q generation circuit 26 generates a local signal of the second sensor signal and outputs the local signal to quadrature demodulator 28. The local signal has a 90° phase difference from the second sensor signal received from frequency sweep circuit 12.

Quadrature demodulator 28 generates analog I/Q data of the first sensor signal by performing quadrature detection on the local signal of the first sensor signal output from I/Q generation circuit 26 and quadrature detection on the reflected signal of the first sensor signal amplified by low noise amplifier 24.

Moreover, quadrature demodulator 28 generates analog I/Q data of the second sensor signal by performing quadrature detection on the local signal of the second sensor signal output from I/Q generation circuit 26 and quadrature detection on the reflected signal of the second sensor signal amplified by low noise amplifier 24.

A/D converter 30 converts the analog I/Q data of the first sensor signal output from quadrature demodulator 28 into digital I/Q data of the first sensor signal, based on a sampling clock signal that is input. Moreover, A/D converter 30 converts the analog I/Q data of the second sensor signal from quadrature demodulator 28 into digital I/Q data of the second sensor signal, based on the sampling clock signal that is input. A/D converter 30 outputs the digital I/Q data of the first sensor signal and the digital I/Q data of the second sensor signal to signal processor 32 of DSP 10.

DSP 10 is a control unit that is used to control radar sensor 8, as illustrated in FIG. 2. DSP 10 controls radar sensor 8, for example, based on a preinstalled code or a hard-wired logic circuit. DSP 10 includes signal processor 32, presence detector 34, motion detector 36, and radar controller 38. Note that each processing of signal processor 32, presence detector 34, motion detector 36, and radar controller 38 may be performed by a microcomputer, for example.

Signal processor 32 generates a beat signal of the first sensor signal by performing fast Fourier transform (FFT) processing on the digital I/Q data of the first sensor signal output from A/D converter 30 of radar sensor 8. Signal processor 32 outputs the generated beat signal of the first sensor signal to presence detector 34. Moreover, signal processor 32 generates a beat signal of the second sensor signal by performing FFT processing on the digital I/Q data of the second sensor signal output from A/D converter 30 of radar sensor 8. Signal processor 32 outputs the generated beat signal of the second sensor signal to motion detector 36. This FFT processing makes it possible to obtain information on the distance, the relative speed, and the arrival angle of object 6, for example. Note that signal processor 32 may change the sampling rate of the digital I/Q data using a decimation filter or the like to perform the FFT processing.

Presence detector 34 performs the first sensing to detect presence of object 6 in specific detection area 4 using the first sensor signal. More specifically, presence detector 34 detects presence of object 6 in specific detection area 4 by comparing the signal strength of the beat signal of the first sensor signal output from signal processor 32 with a threshold. The threshold for each frequency may be different, or may be changed to adapt to the ambient environment of sensing device 2, such as the temperature and density of people there. Presence detector 34 outputs a first mode switching signal to radar controller 38 to cause radar controller 38 to switch from the presence detection mode to the motion detection mode, when presence detector 34 detects the presence of object 6 in specific detection area 4. On the other hand, presence detector 34 outputs a second mode switching signal to radar controller 38 to cause radar controller 38 to switch from the motion detection mode to the presence detection mode, when presence detector 34 detects absence of object 6 in specific detection area 4. Note that presence detector 34 continues operating in both the presence detection mode and the motion detection mode.

Motion detector 36 performs the second sensing to detect a motion of object 6 in specific detection area 4 using the second sensor signal. For example, motion detector 36 inputs a beat signal indicating a motion of object 6 to determine whether change in frequency or phase of the beat signal matches a predetermined change and detect the motion of object 6. Alternatively, motion detector 36 may receive an FFT-processed signal and detect a motion of object 6 based on a result learned by machine learning.

Motion detector 36 detects a motion of object 6 by continuously capturing, for example, a) the distance from radar sensor 8 to object 6, b) the angle of object 6 relative to the front direction of radar sensor 8, and c) the speed of a motion of object 6. More specifically, when object 6 moves his/her hand back and forth with respect to radar sensor 8, motion detector 36 detects the motion of the hand of object 6 by detecting the distance from radar sensor 8 to object 6 being shorter or longer. Note that motion detector 36 operates in the motion detection mode, but does not operate in the presence detection mode.

Radar controller 38 switches from the presence detection mode to the motion detection mode based on the first mode switching signal output from presence detector 34. Radar controller 38 generates a chirp control signal for controlling each of the chirp waveforms of the first sensor signal and the second sensor signal in motion detection mode. Moreover, radar controller 38 switches from the motion detection mode to the presence detection mode based on the second mode switching signal output from presence detector 34. Radar controller 38 generates a chirp control signal for controlling the chirp waveform of the first sensor signal in the presence detection mode. Radar controller 38 outputs the generated chirp control signal to frequency sweep circuit 12 of radar sensor 8.

Moreover, radar controller 38 may output an intermittent control signal to radar sensor 8 to enable or disable the operation of radar sensor 8 to reduce power consumption.

[1-2. Operations of Sensing Device]

Figure 3:
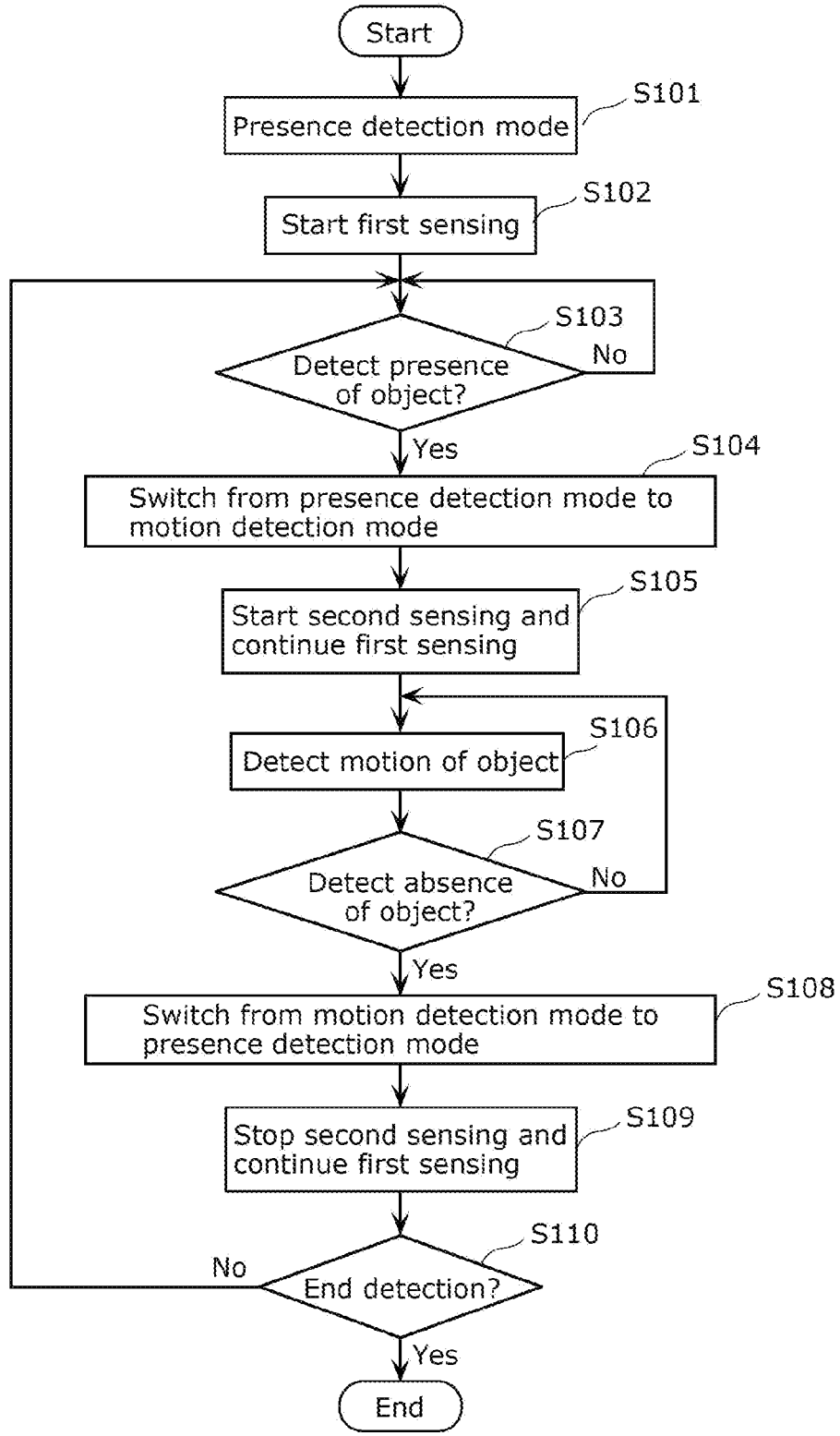
FIG. 3 is a flowchart illustrating a process of operations of the sensing device according to Embodiment 1.
Figure 4:
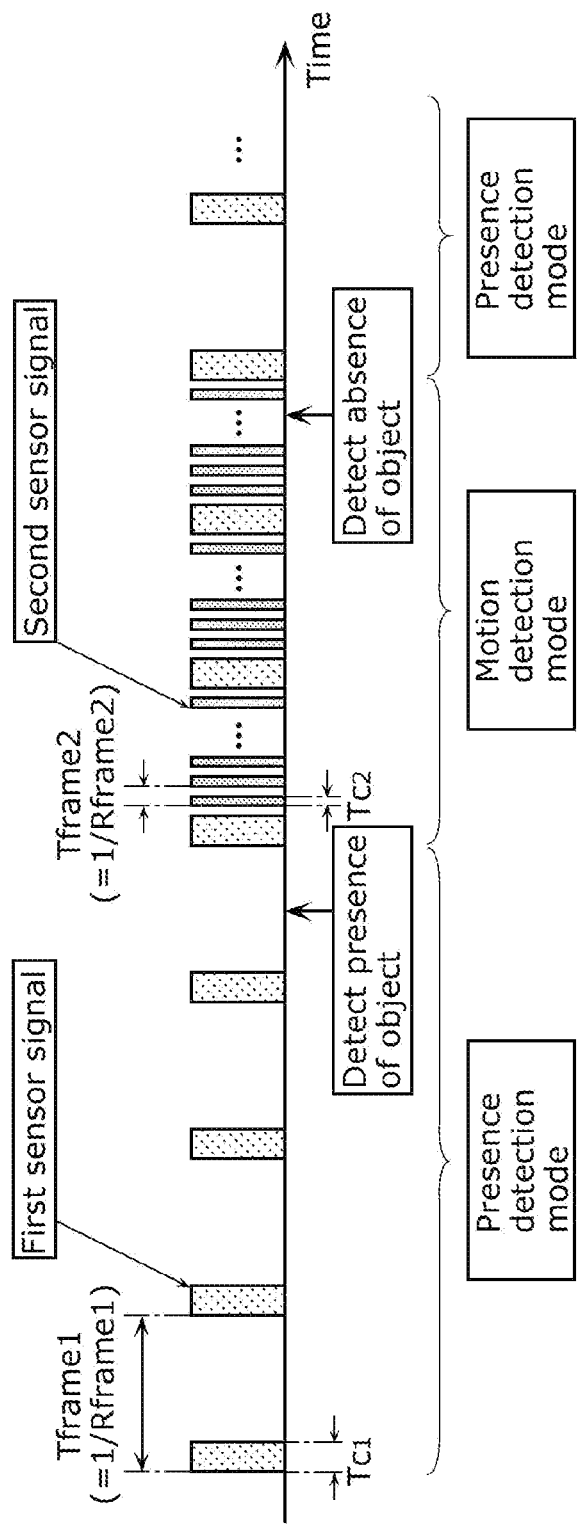
FIG. 4 is a timing chart for describing a presence detection mode and a motion detection mode of the sensing device according to Embodiment 1.
Figure 5A:
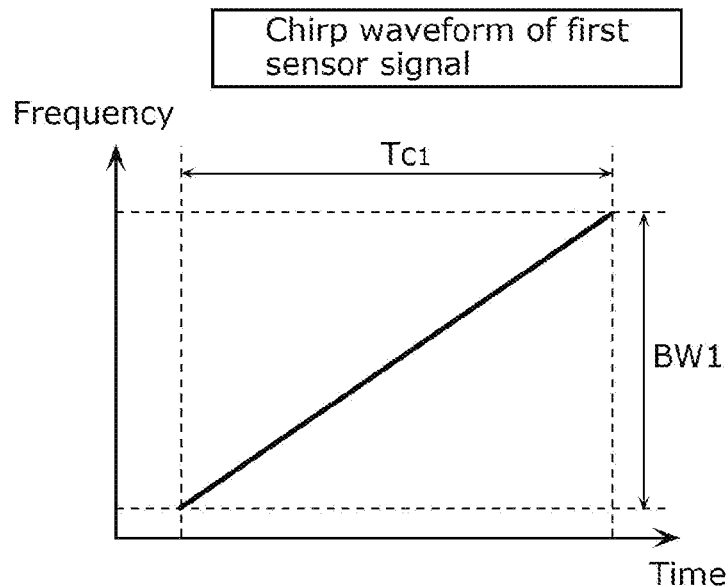
FIG. 5A is a graph showing an example of a chirp waveform of a first sensor signal according to Embodiment 1.
Figure 5B:
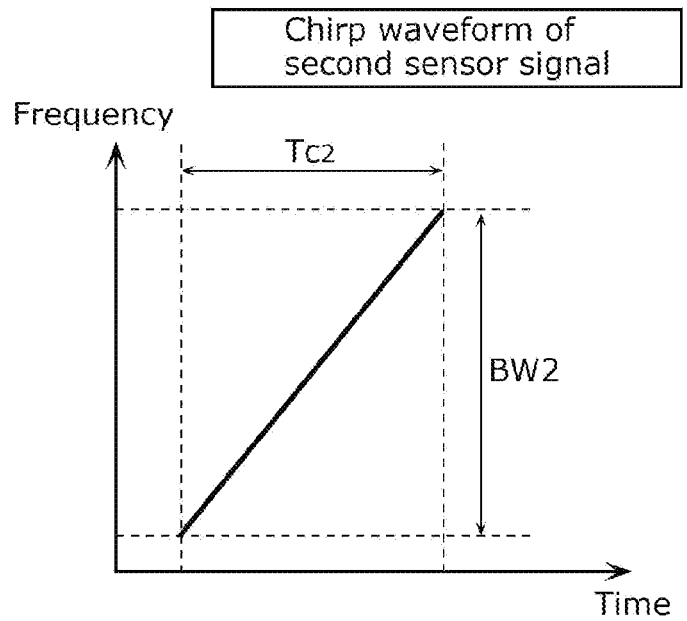
FIG. 5B is a graph showing an example of a chirp waveform of a second sensor signal according to Embodiment 1.
Figure 6:
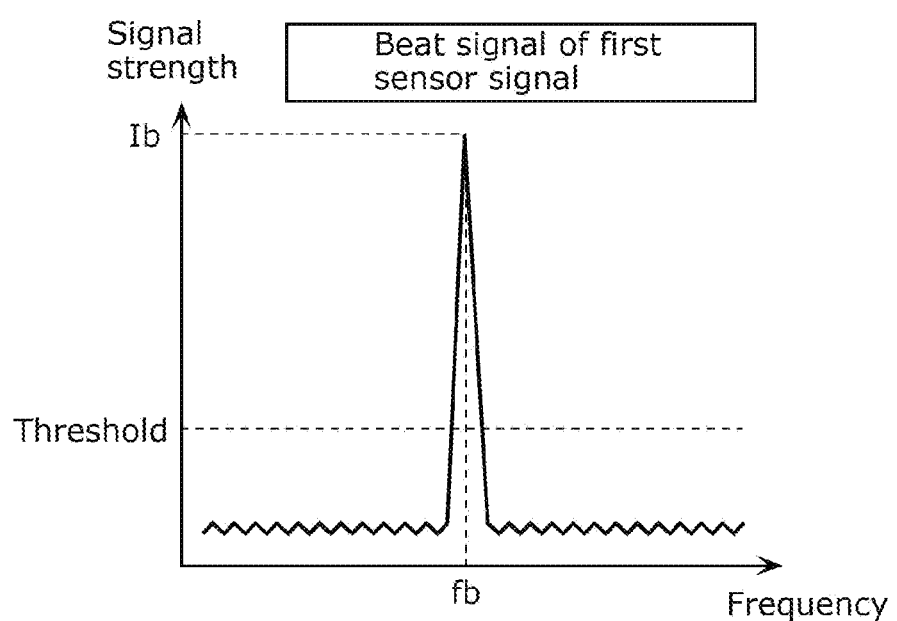
FIG. 6 is a graph showing an example of a beat signal of the first sensor signal according to Embodiment 1.

Next, operations of sensing device 2 according to Embodiment 1 will be described with reference to FIG. 3 through FIG. 6. FIG. 3 is a flowchart illustrating a process of operations of sensing device 2 according to Embodiment 1. FIG. 4 is a timing chart for describing the presence detection mode and the motion detection mode of sensing device 2 according to Embodiment 1. FIG. 5A is a graph showing an example of a chirp waveform of the first sensor signal according to Embodiment 1. FIG. 5B is a graph showing an example of a chirp waveform of a second sensor signal according to Embodiment 1. FIG. 6 is a graph showing an example of a beat signal of the first sensor signal according to Embodiment 1.

As illustrated in FIG. 3, when an operation of sensing device 2 is started, radar controller 38 operates in the presence detection mode (S101) and presence detector 34 starts the first sensing (S102).

As illustrated in FIG. 4, in the presence detection mode, only the first sensing is performed by presence detector 34. In the first sensing, the first sensor signal is transmitted from transmission antenna 20 at first sensing rate Rframe1 per first sensing time Tc1. Note that first sensing rate Rframe1 is a cycle in which the first sensor signal is transmitted from transmission antenna 20. For example, Rframe1=1 Hz. First sensing time Tc1 is time in which the first sensor signal is transmitted from transmission antenna 20 in first frame Tframe1 (=1/Rframe1), which is a reciprocal of first sensing rate Rframe1. For example, Tc1=1 ms. First frame Tframe1 is a unit of time for processing the first sensor signal.

Note that during the period of first sensing time Tc1 in first frame Tframe1, the operation of radar sensor 8 is enabled based on the intermittent control signal output from radar controller 38. On the other hand, during the period other than first sensing time Tc1 in first frame Tframe1, the operation of radar sensor 8 is disabled based on the intermittent control signal output from radar controller 38.

In the first sensing, the signal-to-noise (S/N) ratio of the first sensor signal can be improved by setting first sensing time Tc1 relatively long. As a result, the presence of object 6 located in a farther position can be detected.

As shown in FIG. 5A, the first sensor signal includes one chirp waveform in first sensing time Tc1. In the example shown in FIG. 5A, the chirp waveform of the first sensor signal is an up-chirp in which the frequency increases linearly with time. First sensing time Tc1 of the chirp waveform is 1 ms and first modulation bandwidth BW1 is 500 MHz. Note that the chirp waveform of the first sensor signal is an up-chirp in the present embodiment, but the present disclosure is not limited to such configuration. The chirp waveform of the first sensor signal may be a down-chirp in which the frequency decreases linearly with time, or a combination of an up-chirp and a down-chirp.

In the first sensing, the first sensor signal is transmitted from transmission antenna 20, and reception antenna 22 receives a reflected signal of the first sensor signal that is reflected off one or more objects (including object 6) that are present in specific detection area 4. Subsequently, as described above, signal processor 32 generates a beat signal of the first sensor signal by performing FFT processing on the digital I/Q data of the first sensor signal output from A/D converter 30. For example, as shown in FIG. 6, the beat signal of the first sensor signal is a signal having a peak at beat frequency fb proportional to the distance from radar sensor 8 to object 6. Here, when the distance from radar sensor 8 to object 6 is d, the propagation speed of the first sensor signal (speed of light) is c, the first modulation bandwidth of the first sensor signal is BW1, and the first sensing time is Tc1, beat frequency fb is expressed by the following expression 1.

$$fb=(2d/c)*(BW1/Tc1) \quad \text{(Expression 1)}$$

Returning to FIG. 3, presence detector 34 detects presence or absence of object 6 in specific detection area 4 by comparing the signal strength of the beat signal of the first sensor signal output from signal processor 32 with the threshold (S103). As shown in FIG. 6, presence detector 34 detects the presence of object 6 in specific detection area 4 when signal strength Ib of the beat signal of the first sensor signal is greater than or equal to the threshold. On the other hand, although not shown in the figures, when signal strength Ib of the beat signal of the first sensor signal is less than the threshold, presence detector 34 detects absence of object 6 in specific detection area 4.

Presence detector 34 continues the first sensing when presence detector 34 detects absence of object 6 in specific detection area 4 (No in S103).

On the other hand, when object 6 enters specific detection area 4 and presence detector 34 detects the presence of object 6 in specific detection area 4 (YES in S103), presence detector 34 outputs the first mode switching signal to radar controller 38. Radar controller 38 switches from the presence detection mode to the motion detection mode based on the first mode switching signal output from presence detector 34 (S104). In response to this, motion detector 36 starts the second sensing, and presence detector 34 continues the first sensing (S105).

As illustrated in FIG. 4, in the motion detection mode, both the first sensing by presence detector 34 and the second sensing by motion detector 36 are performed.

The first sensing in the motion detection mode is substantially the same as the first sensing in the presence detection mode described above. Therefore, description thereof is omitted. Note that first sensing rate Rframe1 in the motion detection mode does not necessarily need to be the same as first sensing rate Rframe1 in the presence detection mode (for example, 1 Hz). First sensing rate Rframe1 may be any rate lower than the rate of second sensing rate Rframe1 (for example, 2 Hz or 5 Hz).

In the second sensing, the second sensor signal is transmitted from transmission antenna 20 at second sensing rate Rframe1 per second sensing time Tc2. Note that second sensing rate Rframe1 is a cycle in which the second sensor signal is transmitted from transmission antenna 20. Second sensing rate Rframe1 is higher than first sensing rate Rframe1. For example, Rframe1=60 Hz. Second sensing time Tc2 is time in which the second sensor signal is transmitted from transmission antenna 20 in second frame Tframe2 (=1/Rframe2), which is a reciprocal of second sensing rate Rframe1. Second sensing time Tc2 is shorter than first sensing time Tc1. For example, Tc2=0.1 ms. Second frame Tframe2 is a unit of time for processing the second sensor signal.

As illustrated in FIG. 4, the second sensor signal is transmitted from transmission antenna 20 in the period other than first sensing time Tc1 in first frame Tframe1. In other words, the first sensor signal and the second sensor signal are not simultaneously transmitted from transmission antenna 20.

Note that during the period of second sensing time Tc2 in second frame Tframe2, the operation of radar sensor 8 is enabled based on the intermittent control signal from radar controller 38. On the other hand, during the period other than second sensing time Tc2 in second frame Tframe2, the operation of radar sensor 8 is disabled based on the intermittent control signal output from radar controller 38.

In the second sensing, a fine motion of object 6 can be detected by setting second sensing rate Rframe2 relatively high.

As illustrated in FIG. 5B, the second sensor signal includes one chirp waveform in second sensing time Tc2. In the example shown in FIG. 5B, the chirp waveform of the first sensor signal is an up-chirp. Second sensing time Tc2 of the chirp waveform is 0.1 ms and second modulation bandwidth BW2 is 6 GHz, which is wider than first modulation bandwidth BW1.

In general, when the modulation bandwidth of the chirp waveform is BW and the light speed is c ($=3\times10^8$ m/s), the distance resolution (detection accuracy) is expressed as c/BW/2. Therefore, the distance resolution in the second sensing is approximately 2 cm, calculated by c/BW2/2=3×$10^8$/6 GHz/2, which is higher than the distance resolution in the first sensing, which is approximately 30 cm, calculated by c/BW1/2=3×$10^8$/500 MHz/2. This is because second modulation bandwidth BW2 of the chirp waveform of the second sensor signal is wider than first modulation bandwidth BW1 of the chirp waveform of the first sensor signal.

Note that in the present embodiment, the chirp waveform of the second sensor signal is an up-chirp, but the present disclosure is not limited to such configuration. For example, the chirp waveform of the second sensor signal may be a down-chirp, or a combination of an up-chirp and a down-chirp.

In the second sensing, the second sensor signal is transmitted from transmission antenna 20 and a reflected signal of the second sensor signal that is reflected off one or more objects (including object 6) that are present in specific detection area 4 is received by reception antenna 22. Subsequently, as described above, signal processor 32 generates a beat signal of the second sensor signal by performing FFT processing on the digital I/Q data of the second sensor signal output from A/D converter 30. In response to this, motion detector 36 inputs the beat signal indicating the motion of object 6 to determine whether change infrequency or phase of the beat signal matches the predetermined change and detect the motion of object 6 (S106). Alternatively, motion detector 36 may receive an FFT-processed signal and detect the motion of object 6 based on a result learned by machine learning.

Subsequently, when presence detector 34 detects the presence of object 6 in specific detection area 4 (NO in S107), step S106 described above is performed again.

On the other hand, when object 6 goes outside specific detection area 4 and presence detector 34 detects absence of object 6 in specific detection area 4 (YES in S107), presence detector 34 outputs the second mode switching signal to radar controller 38. Radar controller 38 switches from the motion detection mode to the presence detection mode based on the second mode switching signal output from presence detector 34 (S108). In response to this, motion detector 36 stops the second sensing and presence detector 34 continues the first sensing (S109).

As described above, presence detector 34 continues the first sensing in both the presence detection mode and the motion detection mode. On the other hand, motion detector 36 performs second sensing only in the motion detection mode.

When sensing device 2 continues detecting the presence and a motion of object 6 (NO in S110), sensing device 2 returns to step S103 and repeats steps S103 through S109 as described above. On the other hand, when sensing device 2 ends detection of the presence and a motion of object 6 (YES in S110), the process is ended.

[1-3. Effects]

As described above, in the presence detection mode, the first sensing is performed using the first sensor signal. On the other hand, in the motion detection mode, the second sensing is performed using the second sensor signal having a sensing rate higher than the sensing rate of the first sensor signal.

This makes the detection resolution of the second sensor signal in the second sensing higher than the detection resolution of the first sensor signal in the first sensing. As a result, both the presence and a motion of object 6 in specific detection area 4 can be detected accurately.

In addition, for example, when object 6 goes outside specific detection area 4 during the motion detection mode, the second sensing is stopped and the first sensing is continued by switching from the motion detection mode to the presence detection mode. This allows the second sensing in the motion detection mode to resume smoothly if, for example, object 6 enters specific detection area 4 again.

In addition, sensing device 2 according to the present embodiment can reduce power consumption by switching between the presence detection mode and the motion detection mode as appropriate. The following describes the reasons.

For example, the case where the power consumption of sensing device 2 during sensing is 250 mW, the first sensing time of the first sensor signal is 1 ms, the first sensing rate Rframe1 is 1 Hz, the second sensing time of the second sensor signal is 0.1 ms, and the second sensing rate Rframe2 is 60 Hz is considered. In this case, the power consumption of sensing device 2 in the presence detection mode is 0.25 mW (=250 mW×1 ms×1 Hz). On the other hand, the power consumption of sensing device 2 in the motion detection mode is 1.75 mW, which is obtained by adding the above-described 0.25 mW and 1.5 mW (=250 mW×0.1 ms×60 Hz) together.

Here, when the total time of day in which operating in the presence detection mode is 23 hours and the total time in which operating in the motion detection mode is 1 hour, the average daily power consumption is approximately 0.3 mW. Accordingly, the power consumption can be kept low. This is particularly effective when sensing device 2 is driven by a battery, for example.

Embodiment 2

[2-1. Configuration of Sensing Device]

Figure 7:
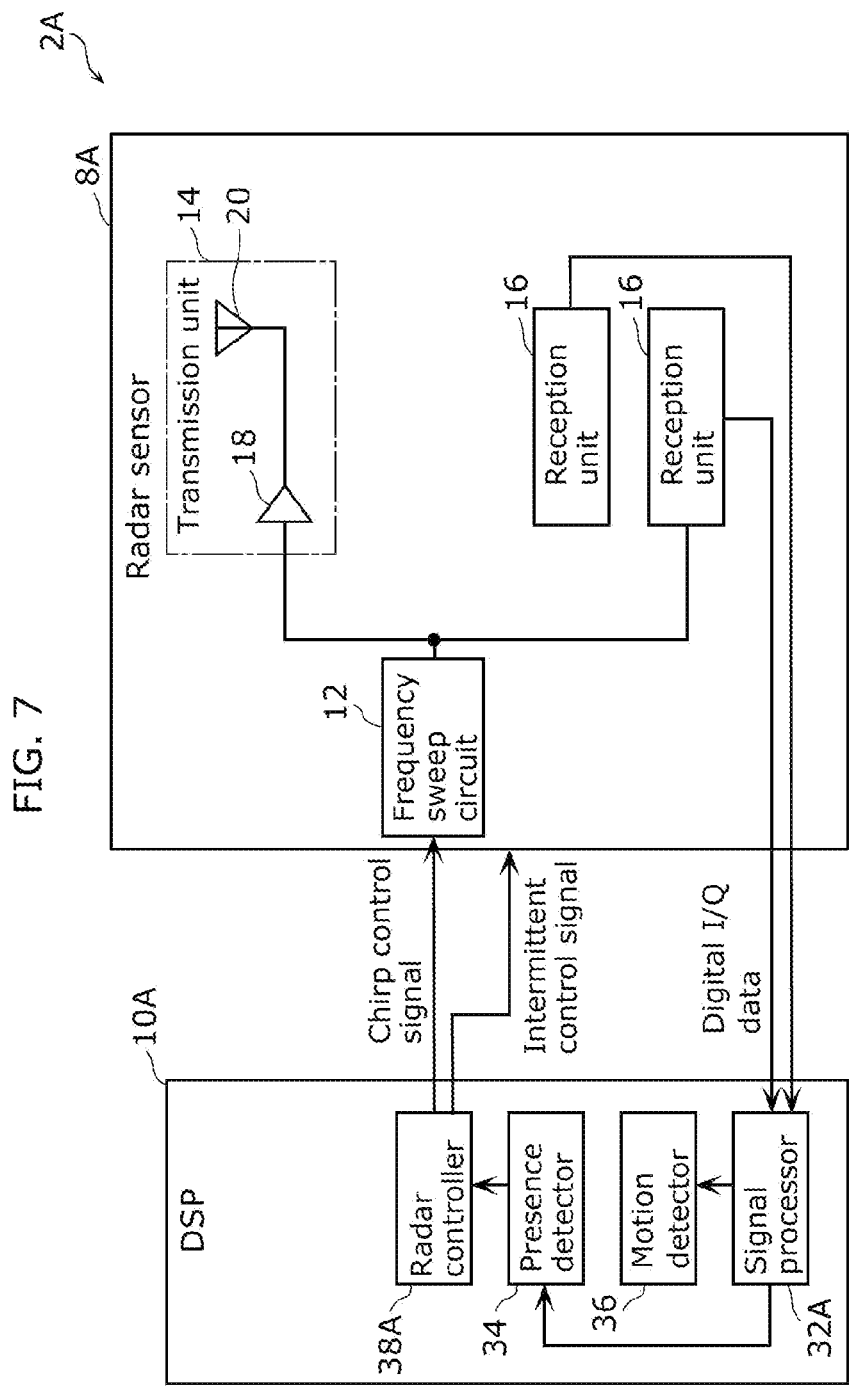
FIG. 7 is a block diagram illustrating the configuration of a sensing device according to Embodiment 2.
Figure 8A:
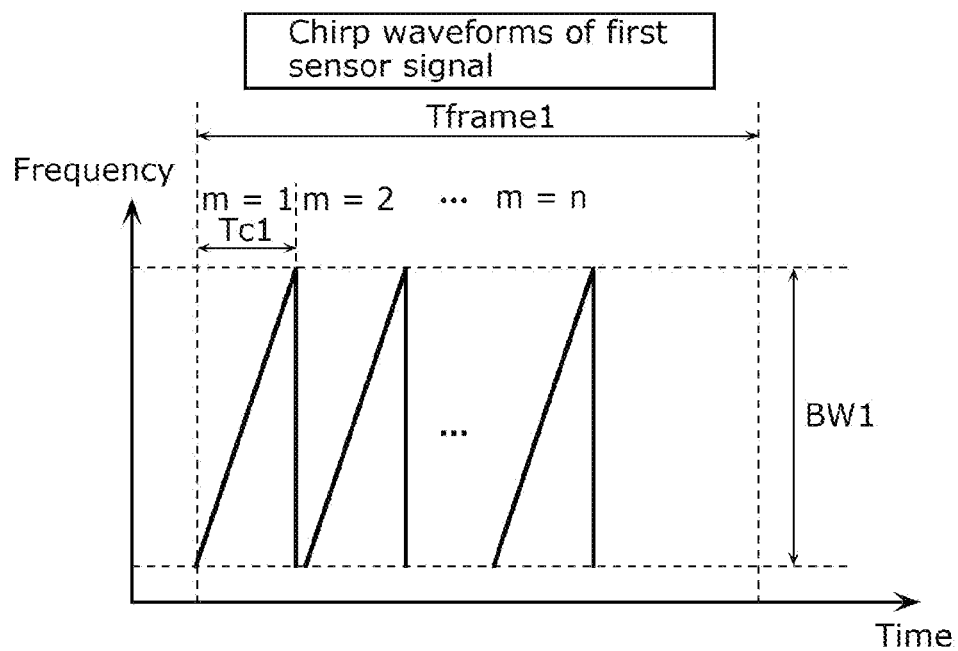
FIG. 8A is a graph showing an example of chirp waveforms of a first sensor signal according to Embodiment 2.
Figure 8B:
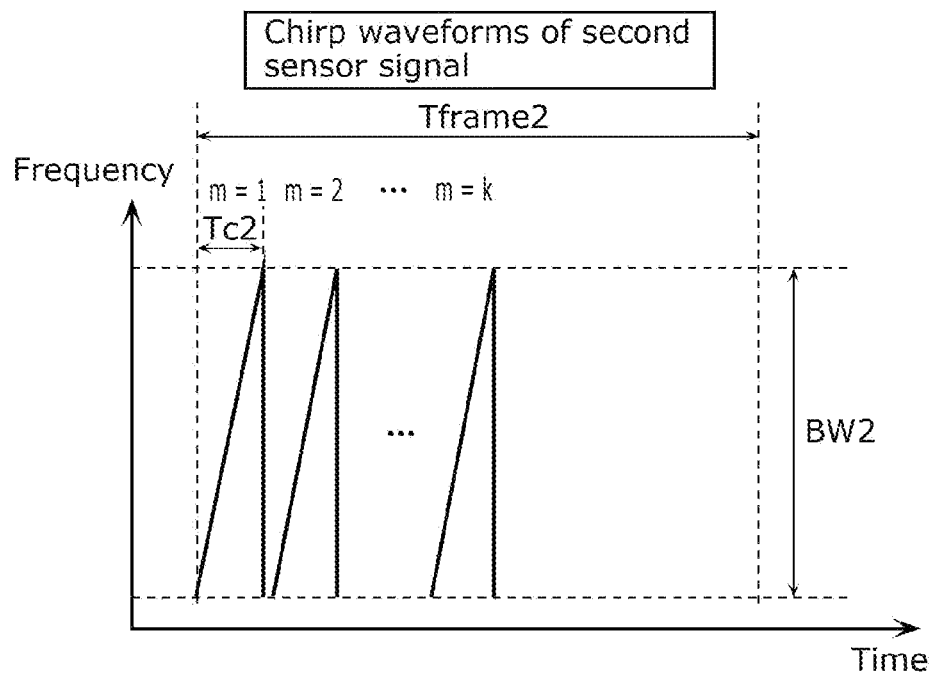
FIG. 8B is a graph showing an example of chirp waveforms of a second sensor signal according to Embodiment 2.

Next, the configuration of sensing device 2A according to Embodiment 2 will be described with reference to FIG. 7 through FIG. 8B. FIG. 7 is a block diagram illustrating the configuration of sensing device 2A according to Embodiment 2. FIG. 8A is a graph showing an example of chirp waveforms of a first sensor signal according to Embodiment 2. FIG. 8B is a graph showing an example of chirp waveforms of a second sensor signal according to Embodiment 2. In the following embodiments, the structural components that are substantially the same as the structural components according to Embodiment 1 share like reference signs. Detailed description of such structural components will be omitted.

As illustrated in FIG. 7, sensing device 2A according to Embodiment 2 differs from sensing device 2 according to Embodiment 1 in that radar sensor 8A includes a plurality of reception units 16. The configuration of each of reception units 16 is the same as the configuration of reception unit 16 described in Embodiment 1. A/D converter 30 (see FIG. 2) in each of reception units 16 outputs digital I/Q data of the first sensor signal and digital I/Q data of the second sensor signal to signal processor 32A of DSP 10A. Note that, for convenience of description, FIG. 7 illustrates simplified reception units 16. In the example illustrated in FIG. 7, radar sensor 8A includes two reception units 16 and one transmission unit 14. However, radar sensor 8A may include three or more reception units 16, or two or more transmission units 14.

Furthermore, sensing device 2A according to Embodiment 2 differs from sensing device 2 according to Embodiment 1 in the chirp control signal generated by radar controller 38A of DSP 10A. More specifically, as shown in FIG. 8A, the first sensor signal includes n chirp waveforms (n is an integer greater than or equal to two) in first sensing time n×Tc1. In other words, the first sensor signal includes n chirp waveforms in first sensing time Tframe1. Therefore, n×Tc1 is the first sensing time in first frame Tframe1. In the example shown in FIG. 8A, the chirp waveforms of the first sensor signal are up-chirps. First sensing time Tc1 of one chirp waveform is 100 μs, and first modulation bandwidth BW1 is 500 MHz.

As shown in FIG. 8B, the second sensor signal includes k waveforms (where k is an integer greater than or equal to two) in second frame Tframe1. Here, k×Tc2 is the second sensing time in second frame Tframe1, and is shorter than the first sensing time. Note that, in the example shown in FIG. 8B, the chirp waveforms of the second sensor signal are up-chirps. Second sensing time Tc2 of one chirp waveform is 50 μs and second modulation bandwidth BW2 is 6 GHz, which is wider than first modulation bandwidth BW1.

[2-2. Effects]

As described above, radar sensor 8A includes a plurality of reception units 16. Therefore, signal processor 32A of DSP 10A generates a beat signal for each of reception units 16, based on the first sensor signals received by reception units 16. This enables signal processor 32A to detect an arrival angle of a reflected signal of the first sensor signal reflected off object 6 or the like, based on phase differences between the beat signals.

Moreover, in the present embodiment, each of the first sensor signal and the second sensor signal includes a plurality of chirp signals. Therefore, signal processor 32A can detect the speed of a motion of object 6.

While in the present embodiment, the first sensor signal and the second sensor signal each include a plurality of chirp signals, the present disclosure is not limited to such configuration. For example, the first sensor signal may include one chirp signal, and the second sensor signal may include a plurality of chirp signals. Alternatively, the first sensor signal may include a plurality of chirp signals and the second sensor signal may include one chirp signal.

Embodiment 3

[3-1. Configuration and Operations of Sensing Device]

Figure 9:
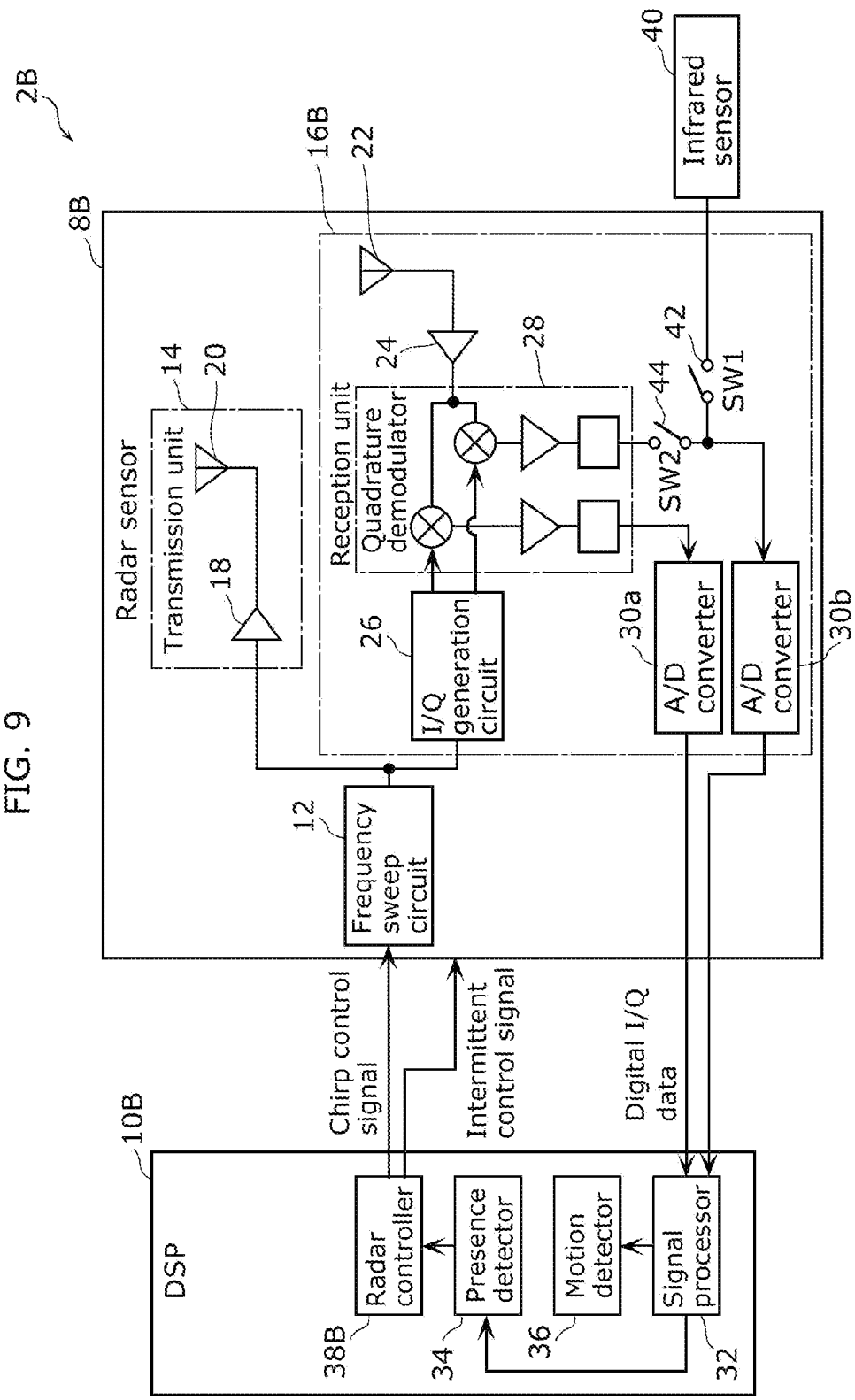
FIG. 9 is a block diagram illustrating the configuration of a sensing device according to Embodiment 3.
Figure 10:
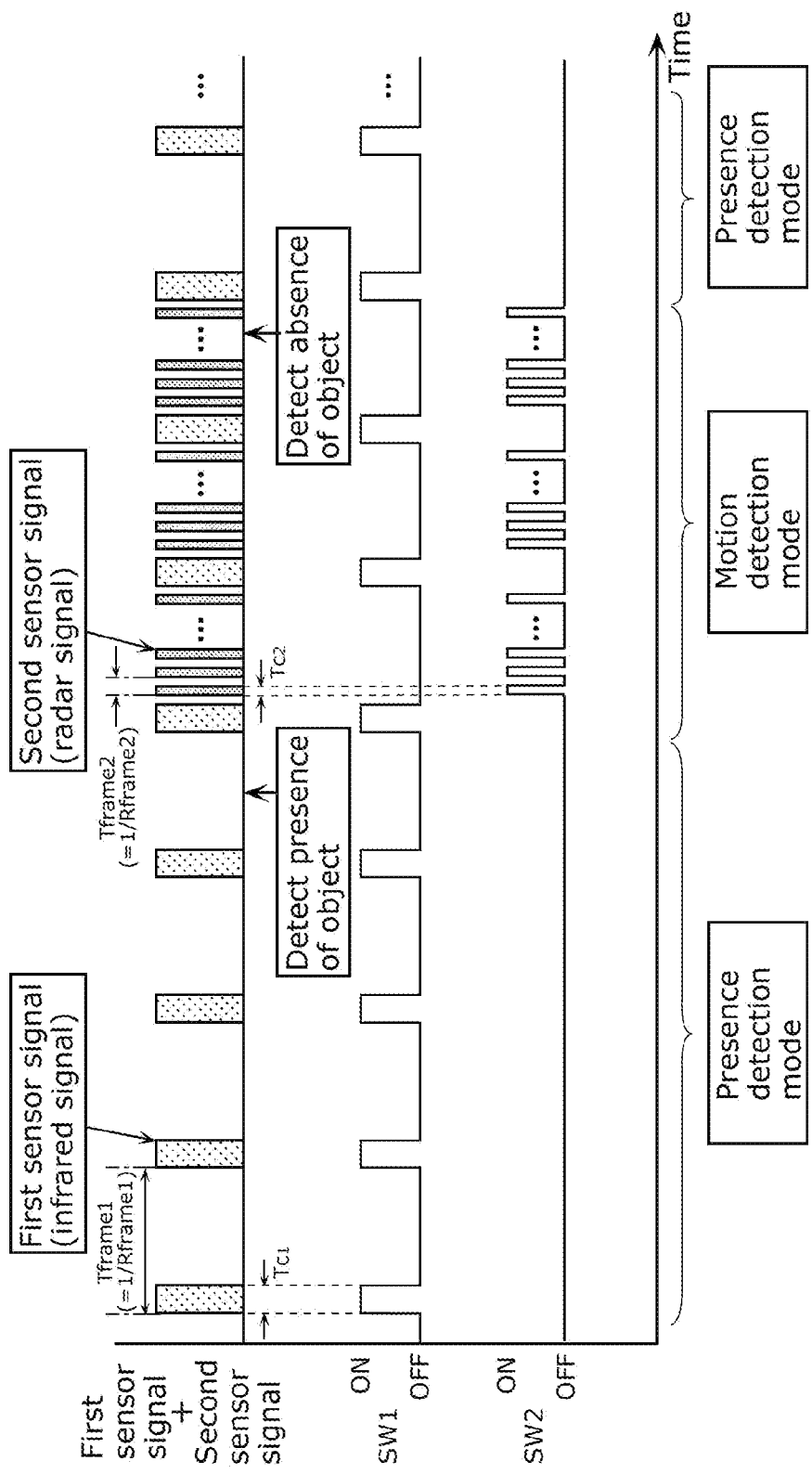
FIG. 10 is a timing chart for describing a presence detection mode and a motion detection mode to be performed by the sensing device according to Embodiment 3.

Next, the configuration and operations of sensing device 2B according to Embodiment 3 will be described with reference to FIG. 9 and FIG. 10. FIG. 9 is a block diagram illustrating the configuration of sensing device 2B according to Embodiment 3. FIG. 10 is a timing chart for describing a presence detection mode and a motion detection mode of sensing device 2B according to Embodiment 3.

As illustrated in FIG. 9, sensing device 2B according to Embodiment 3 differs from sensing device 2 according to Embodiment 1 in that sensing device 2B includes infrared sensor 40 (one example of the sensor) in addition to radar sensor 8B. Infrared sensor 40 receives, as the first sensor signal, with a photodiode, infrared radiation emitted from object 6 such as a person (as illustrated in FIG. 1) in specific sensing area 4 (as illustrated in FIG. 1).

Reception unit 16B of radar sensor 8B includes reception antenna 22, low noise amplifier 24, I/Q generation circuit 26, quadrature demodulator 28, and A/D converters 30a and 30b. In addition to that, reception unit 16B of radar sensor 8B includes first switch 42 and second switch 44. For convenience of description, in FIG. 9 and FIG. 10, first switch 42 and second switch 44 are denoted as SW1 and SW2 respectively.

First switch 42 is an on/off switch disposed between infrared sensor 40 and A/D converter 30b. Second switch 44 is an on/off switch disposed between quadrature demodulator 28 and A/D converter 30b. Each of first switch 42 and second switch 44 is turned on and off based on an intermittent control signal output from radar controller 38B. Note that the configurations of A/D converters 30a and 30b are the same as the configuration of A/D converter 30 in Embodiment 1.

Radar controller 38B of DSP 1013 generates a chirp control signal for controlling a chirp waveform of the second sensor signal in the motion detection mode. Note that radar controller 38B does not generate a chirp control signal for controlling a chirp waveform of the first sensor signal in the presence detection mode or the motion detection mode. Therefore, transmission antenna 20 transmits only the second sensor signal, and reception antenna 22 receives only a reflected signal of the second sensor signal.

As illustrated in FIG. 10, in the presence detection mode, only the first sensing is performed by presence detector 34. In the first sensing, first switch 42 is turned on and off repeatedly. The first sensor signal received by infrared sensor 40 is received while first switch 42 is on. Note that in presence detection mode, second switch 44 is off, and radar sensor 8B enables operations of A/D converter 30b and disables operations of A/D converter 30a.

In the first sensing, infrared radiation radiated from object 6 or the like in specific detection area 4 is received as the first sensor signal by infrared sensor 40. Subsequently, in the same manner as in Embodiment 1, signal processor 32 performs processing on digital data of the first sensor signal output from AD converter 30b. Subsequently, presence detector 34 detects presence or absence of object 6 in specific detection area 4 by comparing the signal strength of the first sensor signal output from signal processor 32 with a threshold.

As illustrated in FIG. 10, in the motion detection mode, both the first sensing by presence detector 34 and the second sensing by motion detector 36 are performed. In the motion detection mode, radar sensor 8B enables both operations of A/D converters 30a and 30b.

In the first sensing in the motion detection mode, second switch 44 is off and first switch 42 is turned on and off repeatedly. While first switch 42 is on, the first sensor signal received by infrared sensor 40 is received.

In the second sensing in the motion detection mode, first switch 42 is off and second switch 44 is turned on and off repeatedly. While second switch 44 is on, the second sensor signal is transmitted from transmission antenna 20.

Note that in Embodiment 1, the first sensor signal and the second sensor signal are both FMCW radar signals. Therefore, there is a restriction that second sensing time Tc2 needs to be shorter than first sensing time Tc1. On the other hand, since the first sensor signal is infrared radiation and the second sensor signal is an FMCW radar signal in the present embodiment, there is no such restriction as in Embodiment 1 and second sensing time Tc2 does not necessarily need to be shorter than first sensing time Tc1.

In the second sensing, the second sensor signal is transmitted from transmission antenna 20 and a reflected signal of the second sensor signal that is reflected off object 6 or the like present in specific detection area 4 is received by reception antenna 22. Subsequently, in the same manner as described in Embodiment 1, signal processor 32 generates a beat signal of the second sensor signal by performing FFT processing on the digital I/Q data of the second sensor signal output from A/D converter 30a. With this, motion detector 36 inputs a beat signal indicating the motion of object 6 to determine whether change in frequency or phase of the beat signal matches a predetermined change and detect the motion of object 6. Alternatively, motion detector 36 may receive an FFT-processed signal and detect a motion of object 6 based on a result learned by machine learning.

[3-2. Effects]

Even when radar sensor 8B and infrared sensor 40 are used as sensors as in the present embodiment, an effect similar to the effect of Embodiment 1 can be obtained.

Although infrared sensor 40 is used in the present embodiment, other types of sensors may be used instead of infrared sensor 40.

Variations Etc.

The sensing method and the sensing device according to one or more aspects of the present disclosure have been described above based on the embodiments, but the present disclosure is not limited to the embodiments. One or more aspects of the present disclosure may include, without departing from the scope of the present disclosure, one or more variations achieved by making various modifications to the present disclosure that can be conceived by those skilled in the art, or one or more embodiments obtained by combining structural components in different embodiments.

In each of the embodiments, sensing device 2 (2A, 2B) is provided in an AI speaker, but the present disclosure is not limited to this configuration. The sensing devices may be provided in various devices, such as a television receiver or an air conditioner.

Moreover, while in Embodiment 1, an example in which object 6 is a person has been described, the present disclosure is not limited to such configuration. Object 6 may be, for example, a vehicle, a bicycle, or an animal.

While in Embodiment 3, an example in which object 6 is a person has been described, the present disclosure is not limited to such configuration. Object 6 may be, for example, an animal that emits infrared radiation.

In addition, in Embodiments 1 and 2, signal processor 32 performs FFT processing on the digital I/Q data of the first sensor signal and the digital I/Q data of the second sensor signal, but the present disclosure is not limited to such configuration. For example, root means square (RMS) processing may be performed.

In Embodiments 1 and 2, presence detector 34 detects the presence of object 6 in specific detection area 4 when signal strength of the beat signal of the first sensor signal is greater than or equal to the threshold. However, beat frequency fb of the beat signal may be limited to a predetermined frequency range corresponding to specific detection area 4. In other words, presence detector 34 detects absence of object 6 in specific detection area 4, when the signal strength of the beat signal of the first sensor signal is greater than or equal to the threshold and beat frequency fb of the beat signal falls outside the predetermined frequency range that is determined according to specific detection range 4. For example, when specific detection area 4 is within the range of distance D (see FIG. 1)=0 m to 5 m, first modulation bandwidth BW1 of the chirp waveform of the first sensor signal is 0.5 GHz, and first sensing time Tc1 is 1 ms, the upper limit of the predetermined frequency is 16.7 kHz calculated by fb=(2× 5/(3×10$^8$)×(500 MHz/(1×10$^{-3}$)) from expression 1 above. Similarly, when specific detection area 4 is within the range of distance D (see FIG. 1)=1 m to 5 m, the upper limit of the predetermined frequency is 16.7 kHz from expression 1 above and the lower limit of the predetermined frequency is 3.4 kHz.

As another example, presence detector 34 may detect absence of object 6 in specific detection area 4, when the signal strength of the beat signal of the first sensor signal is greater than or equal to the threshold and beat frequency fb of the beat signal falls outside a predetermined frequency range corresponding to a range of speed (for example, 0.5 m/s to 3 m/s) of motion of object 6.

As still another example, when it is possible to detect the arrival angle of the reflected signal of the first sensor signal reflected off object 6 as in Embodiment 2, detection may be performed as follows: in other words, presence detector 34 may detect absence of object 6 in specific detection area 4, when the signal strength of the beat signal of the first sensor signal is greater than or equal to the threshold and beat frequency fb of the beat signal falls outside a predetermined frequency range corresponding to a range of arrival angle (for example, ±60° with respect to the front direction of radar sensor 8).

In Embodiments 1 and 2, the configuration parameters of the first sensor signal and the second sensor signal are constant. However, the configuration parameters of the first sensor signal and the second sensor signal may be changed according to the signal strengths of the respective beat signals of the first sensor signal and the second sensor signal. For example, when the signal strength of the beat signal of the first sensor signal (second sensor signal) is less than a threshold, the first sensing time (second sensing time) may be increased and/or the transmission power of the first sensor signal (second sensor signal) may be increased. On the other hand, when the signal strength of the beat signal of the first sensor signal (second sensor signal) is sufficiently greater than the threshold, the first sensing time (second sensing time) may be shortened and/or the transmission power of the first sensor signal (second sensor signal) may be reduced.

Furthermore, in Embodiments 1 and 2, the first sensor signal is modulated with first modulation bandwidth BW1 and transmitted from radar sensor 8 (8A) per first sensing time Tc1 in the first sensing, and the second sensor signal is modulated with second modulation bandwidth BW2 and transmitted from radar sensor 8 (8A) per second sensing time Tc2 that is shorter than first sensing time Tc1, second modulation bandwidth BW2 being wider than first modulation bandwidth BW1. However, the present disclosure is not limited to such configuration. It is also possible to satisfy only one of the relationship of the length between the sensing times (TC1>TC2) and the relationship of the width between the modulation bandwidths (BW2>BW1).

In addition, part or all of the structural components of sensing device 2 (2A, 2B) in each of the above embodiments may include a single system large scale integration (LSI).

A system LSI is a super-multifunction LSI manufactured with a plurality of components integrated on a single chip, and specifically is a) DSP or a microprocessor, b) a read only memory (ROM), and c) a random access memory (RAM), for example. The ROM stores a program. The system LSI will achieve its function as a result of the DSP or microprocessor operating in accordance with the program described above.

Note that the term system LSI has been used as an example, but depending on the degree of integration, IC, LSI, super LSI, and ultra LSI are also used. Moreover, the method of circuit integration is not limited to LSI. Integration may be realized with a dedicated circuit or a general purpose processor. A field-programmable gate array (FPGA) that can be programmed after production of LSI or a reconfigurable processor that allows reconfiguration of the connection or configuration of the inner circuit cells of the LSI circuit may be used.

Moreover, when advancement in semiconductor technology or derivatives of other technologies brings forth a circuit integration technology that replaces LSI, it will be appreciated that such a circuit integration technique may be used to integrate the functional blocks. Application of biotechnology is also a possibility.

In addition, the structural components of sensing device 2 (2A, 2B) in each of the above embodiments may be distributed among a plurality of devices connected via a communication network.

One or more aspects of the present disclosure may include not only such sensing device 2 (2A, 2B), but also a sensing method including the characteristic structural components included in sensing device 2 (2A, 2B) as steps. Moreover, one or more aspects of the present disclosure may be a computer program that causes a computer to execute each characteristic step included in the sensing method. Moreover, one or more aspects of the present disclosure may be a non-transitory computer-readable recording medium on which such a computer program is recorded.

In each embodiment, each structural component may be implemented either by dedicated hardware or by executing a software program appropriate for structural component. Each structural component may be realized as a result of a program executer such as a central processing unit (CPU) or processor reading and executing a software program stored on a storage medium such as a hard disk or semiconductor memory.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The sensing device according to one or more aspects of the present disclosure is applicable to a user interface mounted on an AI speaker, for example.

The invention claimed is:

1. A sensing method for detecting presence and a motion of an object in a specific detection area using a sensor, the sensing method comprising:
   (a) performing first sensing to detect presence or absence of the object in the specific detection area by transmitting a first sensor signal and receiving a first reflected signal of the first sensor signal from the specific detection area;
   (b) when the presence of the object in the specific detection area is detected by the first sensing in (a), continuing the first sensing and performing, concurrently with the first sensing, second sensing to detect a motion of the object by transmitting a second sensor signal and receiving a second reflected signal of the second sensor signal from the specific detection area; and (c) when the absence of the object in the specific detection area is detected by the first sensing in (b), stopping the second sensing and continuing the first sensing, wherein:

the first sensing includes repeatedly transmitting the first sensor signal having a first sensing time from the sensor at a first sensing rate, and in (b), the second sensing includes repeatedly transmitting, in a period other than the first sensor signal being transmitted, the second sensor signal having a second sensing time shorter than the first sensing time from the sensor at a second sensing rate higher than the first sensing rate.

2. The sensing method according to claim 1, wherein the sensor is a radar sensor that transmits the first sensor signal and the second sensor signal, and each of the first sensor signal and the second sensor signal is a frequency modulated continuous wave (FMCW) radar signal, the FMCW radar signal being obtained by modulating a frequency of a continuous wave radar signal.

3. The sensing method according to claim 2, wherein the first sensing includes modulating the first sensor signal with a first modulation bandwidth and transmitting, from the sensor, the first sensor signal modulated, and the second sensing includes modulating the second sensor signal with a second modulation bandwidth and transmitting, from the sensor, the second sensor signal modulated, the second modulation bandwidth being wider than the first modulation bandwidth.

4. The sensing method according to claim 3, wherein the first sensing includes:

generating a beat signal by combining the first sensor signal and the first reflected signal of the first sensor signal; and detecting the presence of the object in the specific detection area when a signal strength of the beat signal is greater than or equal to a threshold.

5. The sensing method according to claim 2, wherein the first sensing includes:

generating a beat signal by combining the first sensor signal and the first reflected signal of the first sensor signal; and detecting the presence of the object in the specific detection area when a signal strength of the beat signal is greater than or equal to a threshold.

6. The sensing method according to claim 5, wherein the first sensing includes detecting the absence of the object in the specific detection area when a beat frequency of the beat signal falls outside a predetermined frequency range, the predetermined frequency range being determined according to the specific detection area.

7. The sensing method according to claim 1, wherein the first sensor signal is an FMCW radar signal that includes at least one chirp waveform in the first sensing time, and the second sensor signal is an FMCW radar signal that includes at least one chirp waveform in the second sensing time.

8. The sensing method according to claim 7, wherein the first sensing includes:

generating a beat signal by combining the first sensor signal and the first reflected signal of the first sensor signal; and detecting the presence of the object in the specific detection area when a signal strength of the beat signal is greater than or equal to a threshold.

9. The sensing method according to claim 1, wherein the first sensing includes:

generating a beat signal by combining the first sensor signal and the first reflected signal of the first sensor signal; and detecting the presence of the object in the specific detection area when a signal strength of the beat signal is greater than or equal to a threshold.

10. The sensing method according to claim 1, wherein the sensor includes:

an infrared sensor that receives infrared radiation as the first reflected signal of the first sensor signal; and a radar sensor that transmits the second sensor signal and receives the second reflected signal of the second sensor signal, the second sensor signal being a frequency modulated continuous wave (FMCW) radar signal.

11. The sensing method according to claim 1, wherein the first sensing detects the presence of the object.

12. A sensing device that detects presence and a motion of an object in a specific detection area, the sensing device comprising:

a sensor that transmits a first sensor signal and receives a first reflected signal of the first sensor signal from the specific detection area and transmits a second sensor signal to the specific detection area; and a controller that controls the sensor, wherein the controller:

(a) performs first sensing to detect presence or absence of the object in the specific detection area using the first sensor signal;

(b) continues the first sensing and performs, concurrently with the first sensing, second sensing to detect a motion of the object using the second sensor signal, when the presence of the object in the specific detection area is detected by the first sensing in (a); and (c) stops the second sensing and continues the first sensing, when the absence of the object in the specific detection area is detected by the first sensing in (b), wherein:

the first sensing includes repeatedly transmitting the first sensor signal having a first sensing time from the sensor at a first sensing rate, and in (b), the second sensing includes repeatedly transmitting, in a period other than the first sensor signal being transmitted, the second sensor signal having a second sensing time shorter than the first sensing time from the sensor at a second sensing rate higher than the first sensing rate.

* * * * *